(12) United States Patent
Tsai et al.

(10) Patent No.: US 11,848,878 B2
(45) Date of Patent: Dec. 19, 2023

(54) BWP OPERATION IN NR-BASED UNLICENSED SPECTRUM

(71) Applicant: Mediatek Inc., Hsin-Chu (TW)

(72) Inventors: Chiou-Wei Tsai, Hsinchu (TW); Jiann-Ching Guey, Hsinchu (TW); Chun-Hsuan Kuo, San Jose, CA (US); Cheng-Rung Tsai, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/407,435

(22) Filed: May 9, 2019

(65) Prior Publication Data

US 2019/0349154 A1 Nov. 14, 2019

Related U.S. Application Data

(60) Provisional application No. 62/670,624, filed on May 11, 2018.

(51) Int. Cl.
| | |
|---|---|
| *H04L 5/00* | (2006.01) |
| *H04W 72/0446* | (2023.01) |
| *H04W 72/0453* | (2023.01) |
| *H04W 72/02* | (2009.01) |
| *H04W 72/23* | (2023.01) |
| *H04W 72/51* | (2023.01) |

(Continued)

(52) U.S. Cl.
CPC .......... *H04L 5/0039* (2013.01); *H04L 5/0055* (2013.01); *H04W 72/0446* (2013.01); *H04W 72/0453* (2013.01); *H04W 72/21* (2023.01); *H04W 72/23* (2023.01); *H04W 72/51* (2023.01); *H04W 74/0816* (2013.01)

(58) Field of Classification Search
None
See application file for complete search history.

(56) References Cited

U.S. PATENT DOCUMENTS

| 10,314,063 B2 * | 6/2019 | Yoon ...................... H04L 5/0044 |
| 2015/0085797 A1 | 3/2015 | Ji et al. |
| 2016/0057770 A1 | 2/2016 | Yerramalli et al. |

(Continued)

FOREIGN PATENT DOCUMENTS

| CN | 107079460 A | 8/2017 |
| KR | 20150119798 A | 10/2015 |

OTHER PUBLICATIONS

International Search Report of PCT/CN2019/086356, dated Jun. 27, 2019.

(Continued)

*Primary Examiner* — Jutai Kao
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a UE. The UE detects one or more signals transmitted from a base station in a first unit of a set of units contained in a bandwidth part of an unlicensed carrier, the first unit having contiguous frequency resources. The one or more signals indicating that the base station has occupied the first unit for a first time duration and indicating a schedule of a set of slots in the first time duration for communication with the base station. The UE receives, in a first time slot of the set of slots and from the base station, a control channel.

18 Claims, 14 Drawing Sheets

(51) Int. Cl.
    *H04W 72/21*        (2023.01)
    *H04W 74/08*        (2009.01)

(56)            References Cited

U.S. PATENT DOCUMENTS

| | | | |
|---|---|---|---|
| 2016/0233989 A1* | 8/2016 | Belghoul | H04L 5/0092 |
| 2017/0237527 A1* | 8/2017 | Lei | H04L 1/0001 |
| | | | 370/445 |
| 2017/0290002 A1 | 10/2017 | Subramanian et al. | |
| 2018/0124687 A1 | 5/2018 | Park et al. | |
| 2018/0343577 A1* | 11/2018 | Takiguchi | H04W 72/542 |
| 2019/0173620 A1* | 6/2019 | Oh | H04L 1/1819 |
| 2019/0174542 A1* | 6/2019 | Lei | H04L 5/0053 |
| 2019/0200349 A1* | 6/2019 | Harada | H04W 72/0413 |
| 2019/0268883 A1* | 8/2019 | Zhang | H04L 5/0053 |
| 2020/0344819 A1* | 10/2020 | Myung | H04W 74/0808 |
| 2021/0227581 A1* | 7/2021 | Karaki | H04W 74/0816 |
| 2021/0235491 A1* | 7/2021 | Iyer | H04W 72/042 |

OTHER PUBLICATIONS

Taiwan Patent Office, "Office Action", dated Dec. 21, 2020, Taiwan.
China Patent Office, "Office Action", dated Jun. 29, 2023, China.
Search Report, dated Jun. 20, 2023, China.

\* cited by examiner

BWP OPERATION IN NR-BASED UNLICENSED SPECTRUM

CROSS-REFERENCE TO RELATED APPLICATION(S)

This application claims the benefits of U.S. Provisional Application Ser. No. 62/670,624, entitled "BWP OPERATION IN NR-BASED UNLICENSED SPECTRUM" and filed on May 11, 2018, which is expressly incorporated by reference herein in their entirety.

BACKGROUND

Field

The present disclosure relates generally to communication systems, and more particularly, to communications on an unlicensed carrier.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. XXX.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
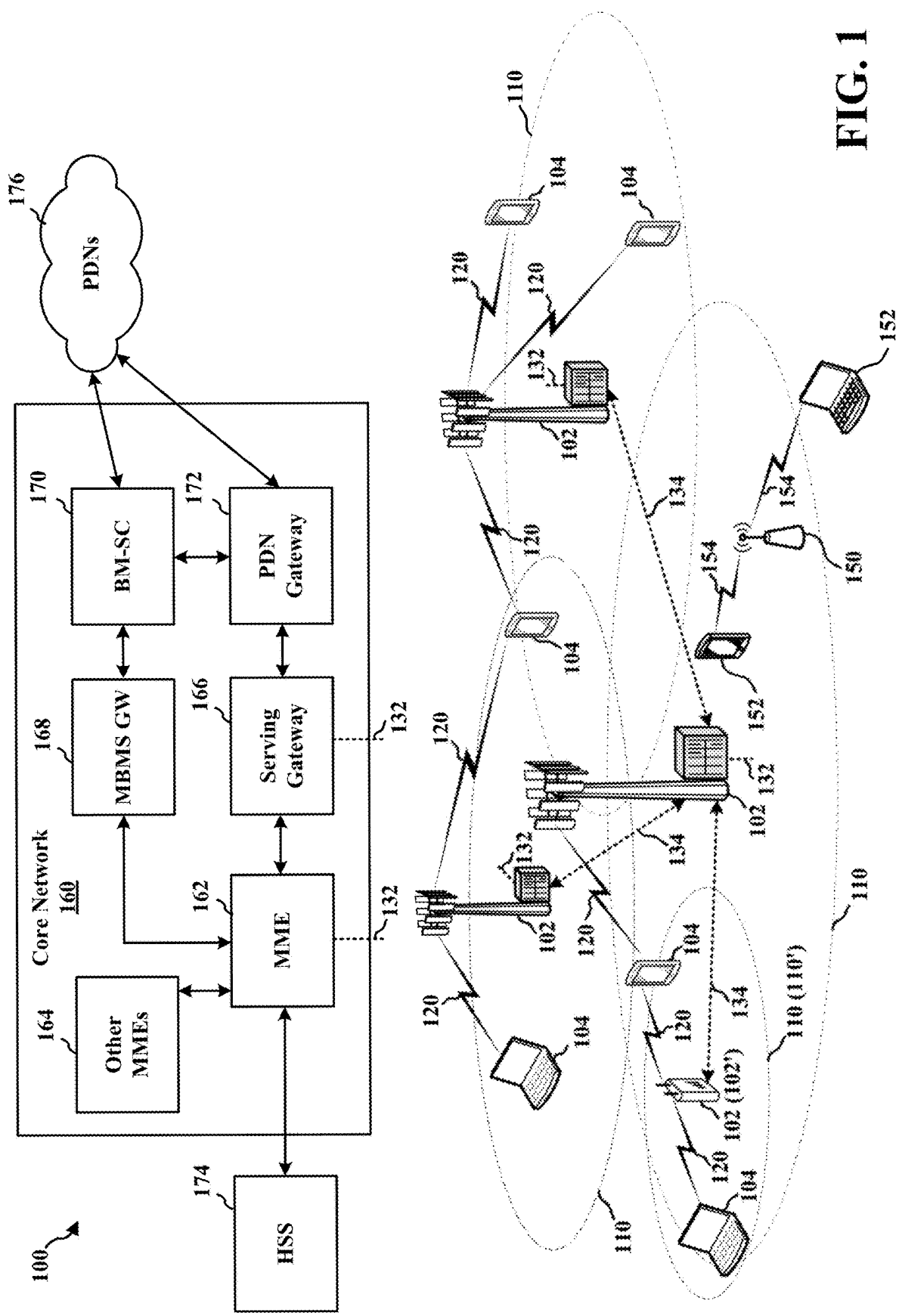
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 1 10. For example, the small cell 102' may have a coverage area 110' that overlaps the coverage area 1 10 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include up-link (UL) (also referred to as reverse link) transmissions from a UE 104 to a base station 102 and/or down-link (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating examples of a supplemental downlink mode (e.g., licensed assisted access (LAA) mode) and of a carrier aggregation mode for a core network that supports unlicensed contention-based shared spectrum. The diagram 200 may be an example of portions of the system 100 of FIG. 1. Moreover, the base station 102-a may be an example of the base stations 102 of FIG. 1, while the UEs 104-a may be examples of the UEs 104 of FIG. 1.

In the example of a supplemental downlink mode (e.g., LAA mode) in diagram 200, the base station 102-a may transmit OFDMA communications signals to a UE 104-a using a downlink 205. The downlink 205 is associated with a frequency F1 in an unlicensed spectrum. The base station 102-a may transmit OFDMA communications signals to the same UE 104-a using a bidirectional link 210 and may receive SC-FDMA communications signals from that UE 104-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 102-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 102-a may transmit OFDMA communications signals to a UE 104-a using a bidirectional link 215 and may receive SC-FDMA communications signals from the same UE 104-a using the bidirectional link 215. The bidirectional link 215 is associated with the frequency F1 in the unlicensed spectrum. The base station 102-a may also transmit OFDMA communications signals to the same UE 104-a using a bidirectional link 220 and may receive SC-FDMA communications signals from the same UE 104-a using the bidirectional link 220. The bidirectional link 220 is associated with a frequency F2 in a licensed spectrum. The bidirectional link 215 may provide a downlink and uplink capacity offload for the base station 102-a. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 102-a may transmit OFDMA communications signals to a UE 104-a using a bidirectional link 225 and may receive SC-FDMA communications signals from the same UE 104-a using the bidirectional link 225. The bidirectional link 225 is associated with the frequency F3 in an unlicensed spectrum. The base station 102-a may also transmit OFDMA communications signals to the same UE 104-a using a bidirectional link 230 and may receive SC-FDMA communications signals from the same UE 104-a using the bidirectional link 230. The bidirectional link 230 is associated with the frequency F2 in the licensed spectrum. The bidirectional link 225 may provide a downlink and uplink capacity offload for the base station 102-a. This example and those provided above are presented for illustrative purposes and there may be other similar modes of operation or deployment scenarios that combine licensed spectrum with or without unlicensed contention-based shared spectrum for capacity offload.

As described supra, the typical service provider that may benefit from the capacity offload offered by using licensed spectrum extended to unlicensed contention-based spectrum is a traditional MNO with licensed spectrum. For these service providers, an operational configuration may include a bootstrapped mode (e.g., supplemental downlink (e.g., LAA mode), carrier aggregation) that uses primary component carrier (PCC) on the non-contention spectrum and the secondary component carrier (SCC) on the contention-based spectrum.

In the supplemental downlink mode, control for contention-based spectrum may be transported over an uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in licensed spectrum (e.g., bidirectional links 210, 220, and 230) while data may be communicated in licensed spectrum extended to unlicensed contention-based shared spectrum (e.g., bidirectional links 215 and 225). The carrier aggregation mechanisms supported when using licensed spectrum extended to unlicensed contention-based shared spectrum may fall under a hybrid frequency division duplexing-time division duplexing (FDD-TDD) carrier aggregation or a TDD-TDD carrier aggregation with different symmetry across component carriers.

FIG. 2B shows a diagram 200-a that illustrates an example of a standalone mode for licensed spectrum extended to unlicensed contention-based shared spectrum. The diagram 200-a may be an example of portions of the access network 100 of FIG. 1. Moreover, the base station 102-b may be an example of the base stations 102 of FIG. 1 and the base station 102-a of FIG. 2A, while the UE 104-b may be an example of the UEs 104 of FIG. 1 and the UEs 104-a of FIG. 2A. In the example of a standalone mode in diagram 200-a, the base station 102-b may transmit OFDMA communications signals to the UE 104-b using a bidirectional link 240 and may receive SC-FDMA communications signals from the UE 104-b using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 102, 205, or 205-a described with reference to FIG. 1, 2A, or 2B, or one of the UEs 104, 215, 215-a, 215-b, or 215-c described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., clear for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system may include additional devices, fewer devices, different devices, or differently arranged devices than those shown in FIGS. 2A and 2B.

Figure 3:
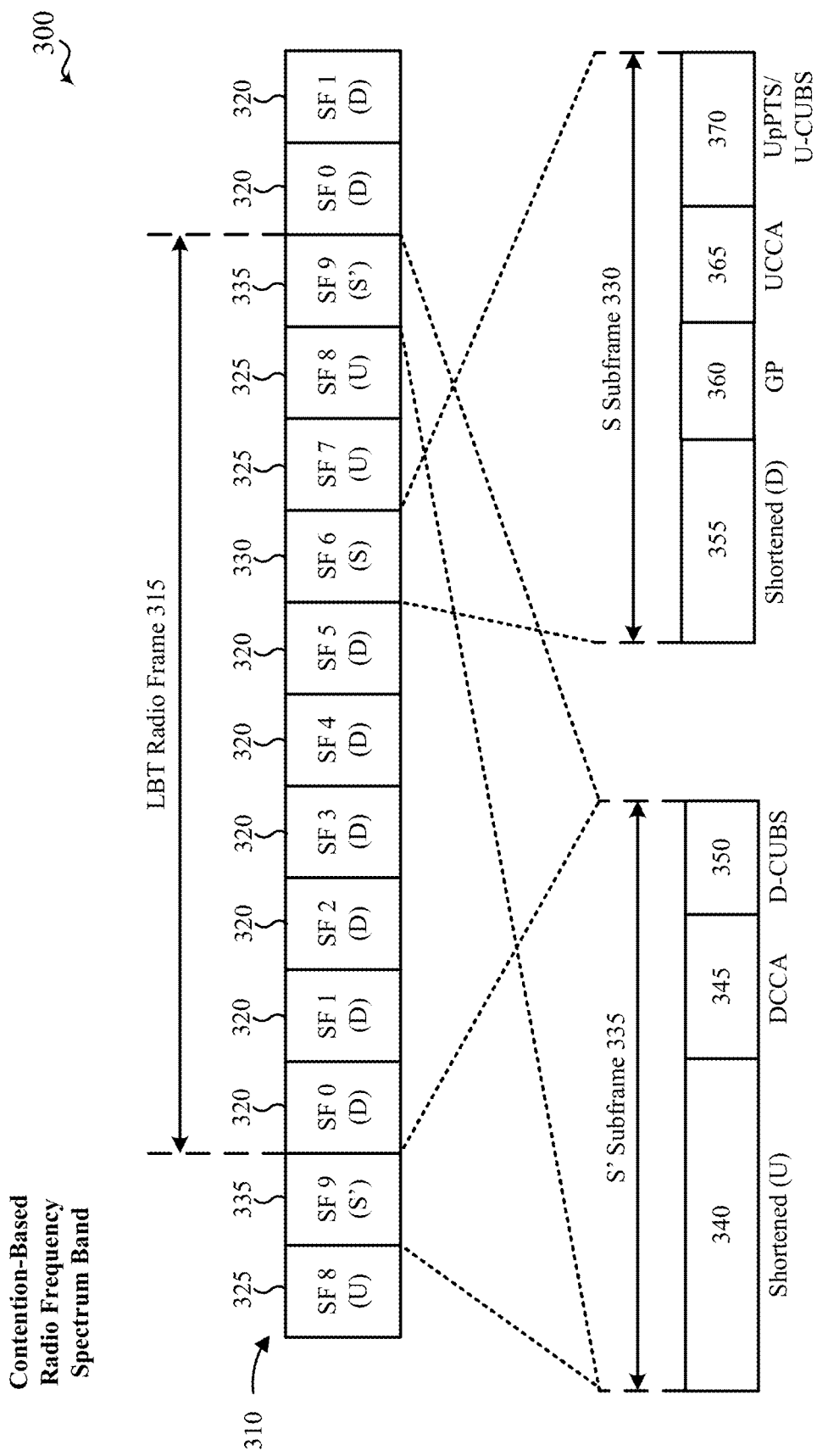
FIG. 3 is an illustration of an example of a wireless communication over an unlicensed radio frequency spectrum band.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

Figure 2:
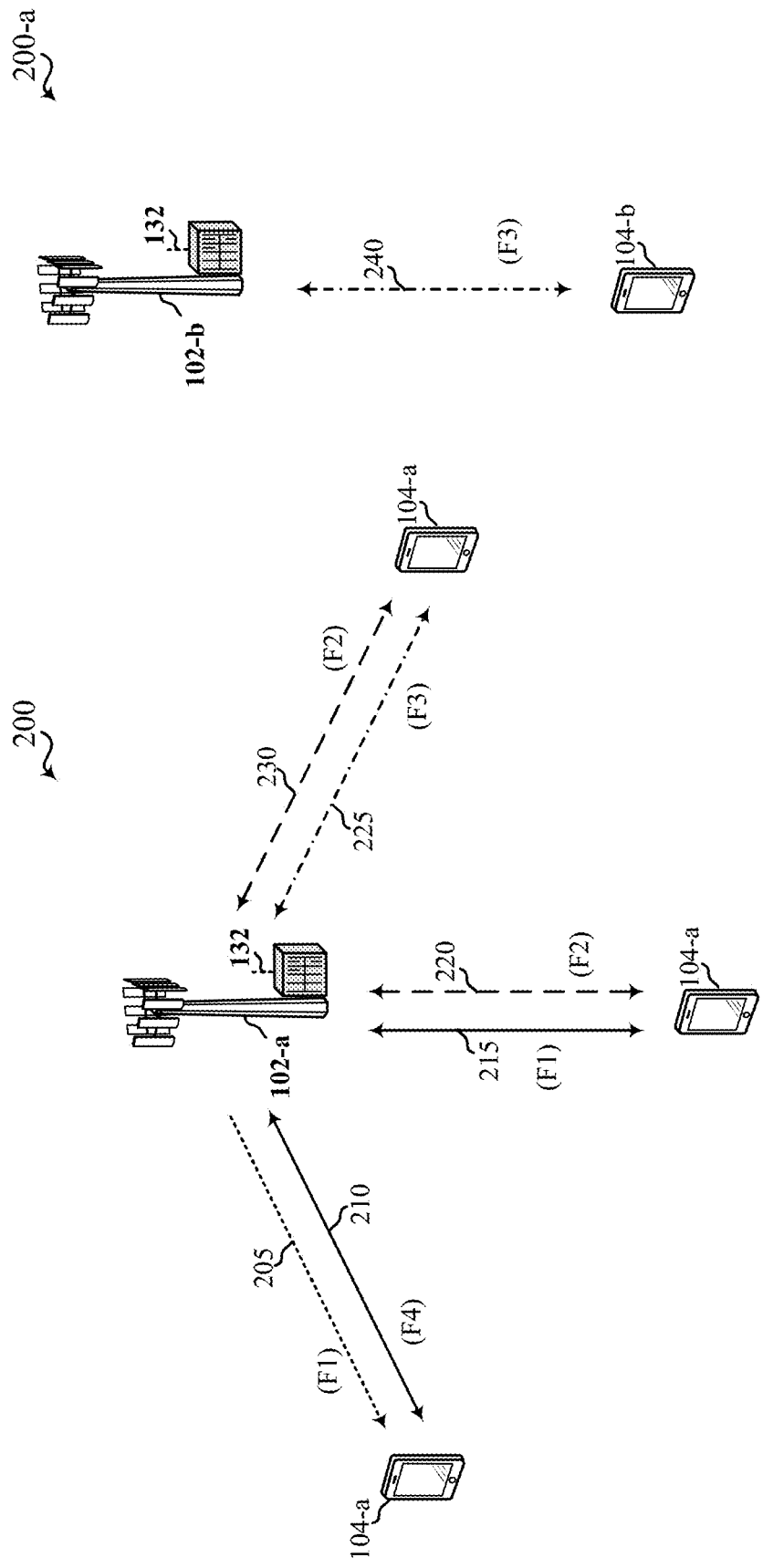
FIG. 2A is a diagram illustrating examples of a supplemental downlink mode and of a carrier aggregation mode for a core network that supports unlicensed contention-based shared spectrum.
FIG. 2B is a diagram that illustrates an example of a standalone mode for licensed spectrum extended to unlicensed contention-based shared spectrum.

During the S' subframe 335, a downlink clear channel assessment (CCA) procedure 345 may be performed by one or more base stations, such as one or more of the base stations 102, 205, or 205-a described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of cell-specific reference signal (CRS), a channel state information reference signal (CSI-RS), a demodulation reference signal (DMRS), a preamble sequence, a synchronization signal, or a physical downlink control channel (PDCCH). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the downlink CCA procedure 345. A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 104, 215, 215-a, 215-b, or 215-c described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA procedure may include a random number of CCA procedures, and in some examples may include a plurality of CCA procedures.

Figure 4:
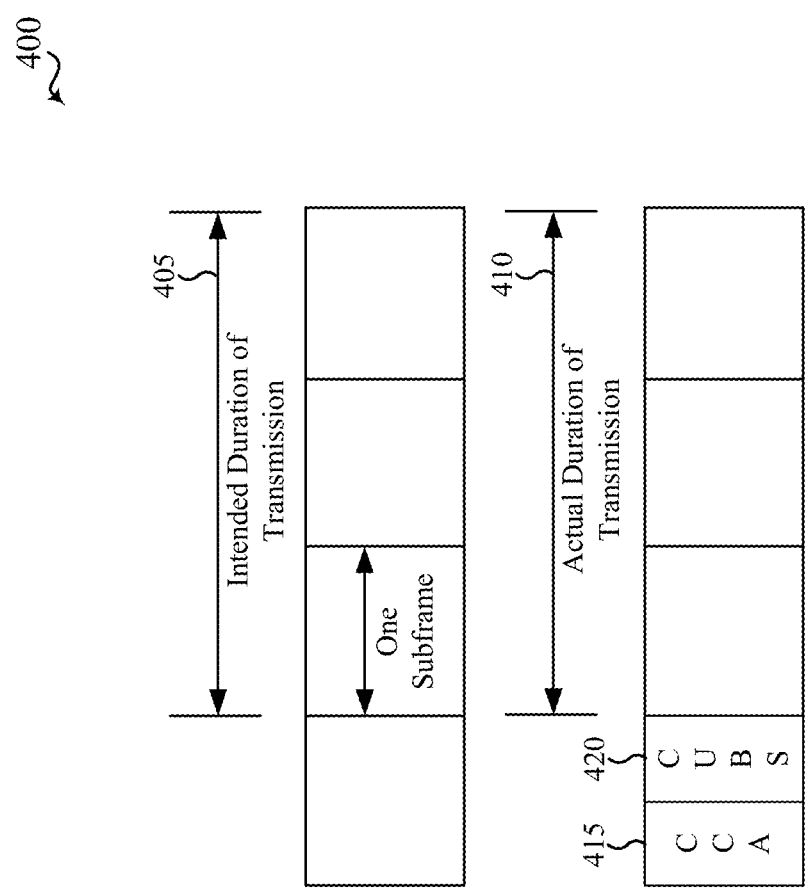
FIG. 4 is an illustration of an example of a CCA procedure performed by a transmitting apparatus when contending for access to a contention-based shared radio frequency spectrum band.

As indicated above, FIG. 3 is provided as an example. Other examples are possible and may differ from what was described in connection with FIG. 3. FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a channel reserving signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
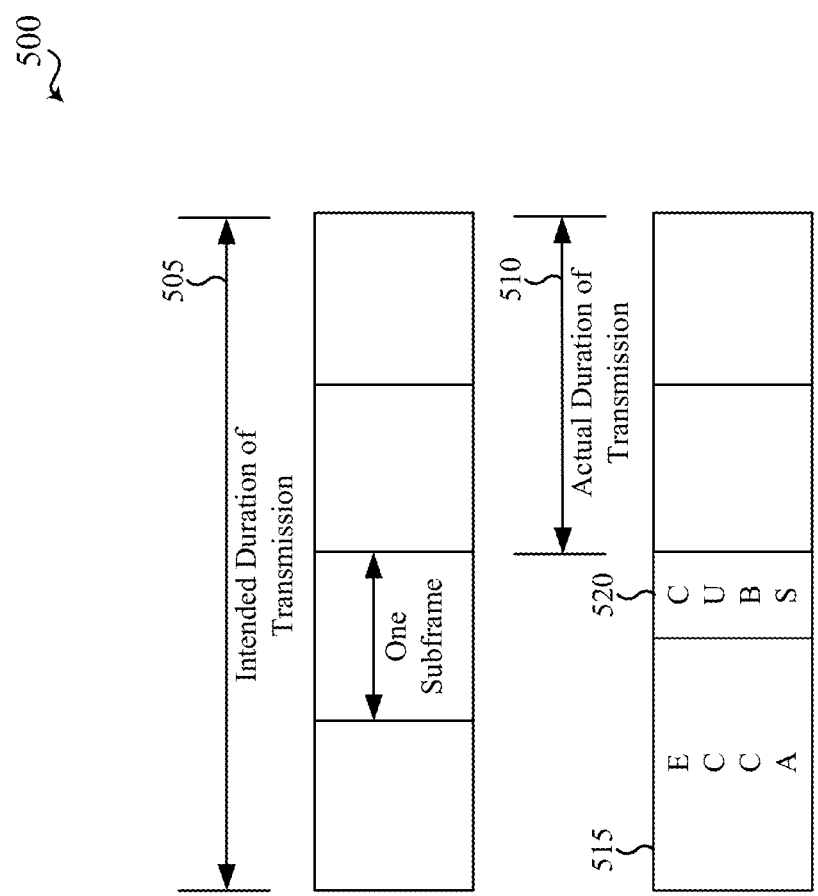
FIG. 5 is an illustration of an example of an extended CCA (ECCA) procedure performed by a transmitting apparatus when contending for access to a contention-based shared radio frequency spectrum band.

FIG. 5 is an illustration of an example 500 of an extended CCA (ECCA) procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the contention-based shared radio frequency spectrum band, but at a potential cost of a shorter data transmission. Following the ECCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
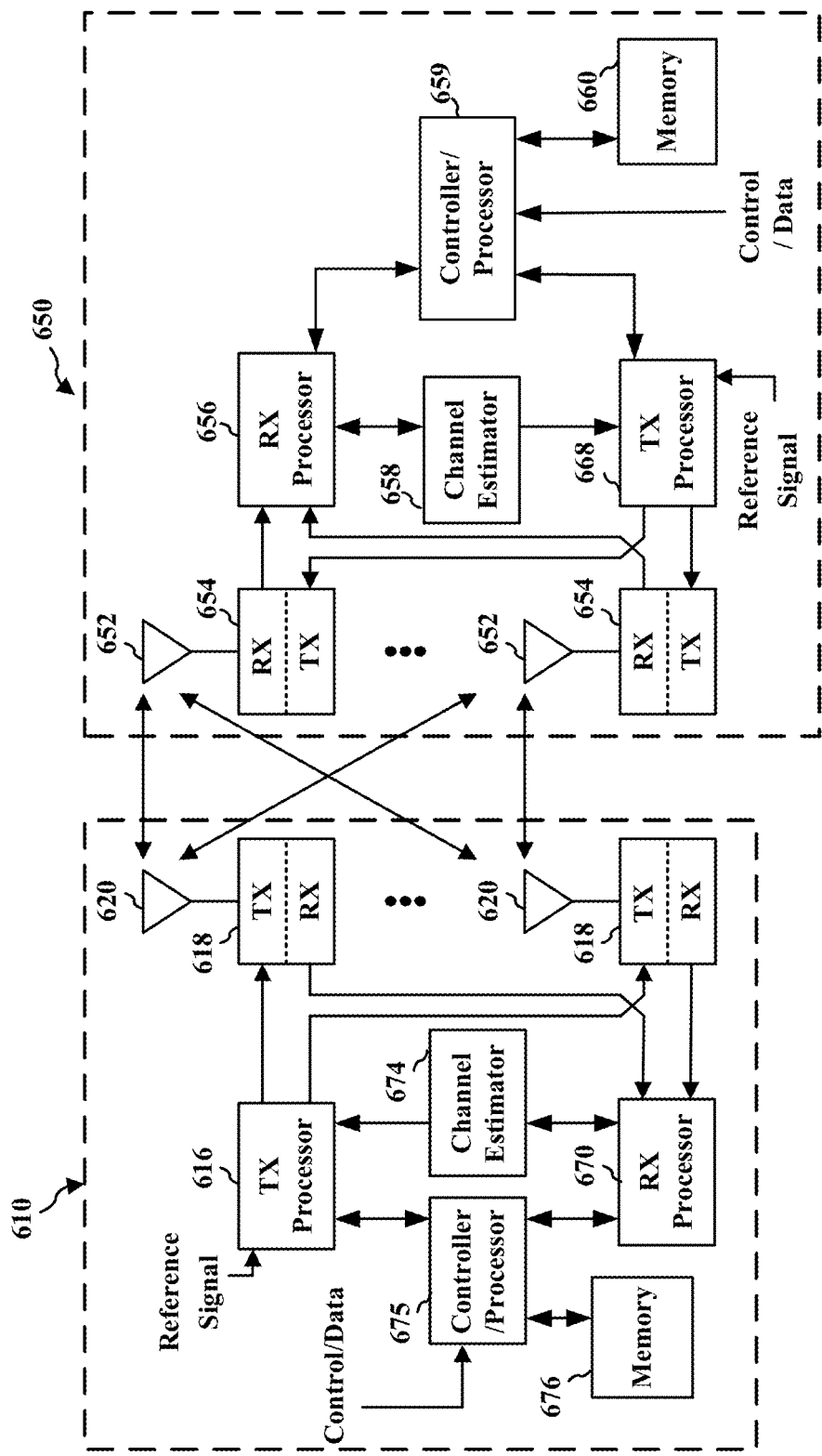
FIG. 6 is a diagram illustrating a base station in communication with a UE in an access network.

FIG. 6 is a block diagram of a base station 610 in communication with a UE 650 in an access network. In the DL, IP packets from the core network 160 may be provided to a controller/processor 675. The controller/processor 675 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 675 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 616 and the receive (RX) processor 670 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 616 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The TX processor 668 and the RX processor 656 implement layer 1 functionality associated with various signal processing functions. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659, which implements layer 3 and layer 2 functionality.

The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, and control signal processing to recover IP packets from the core network 160. The controller/processor 659 is also responsible for error detection using an ACK and/or NACK protocol to support HARQ operations.

Similar to the functionality described in connection with the DL transmission by the base station 610, the controller/processor 659 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission. The UL transmission is processed at the base station 610 in a manner similar to that described in connection with the receiver function at the UE 650. Each receiver 618RX receives a signal through its respective antenna 620. Each receiver 618RX recovers information modulated onto an RF carrier and provides the information to a RX processor 670.

The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover IP packets from the UE 650. IP packets from the controller/processor 675 may be provided to the core network 160. The controller/processor 675 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the up-link and down-link and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit down-link signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
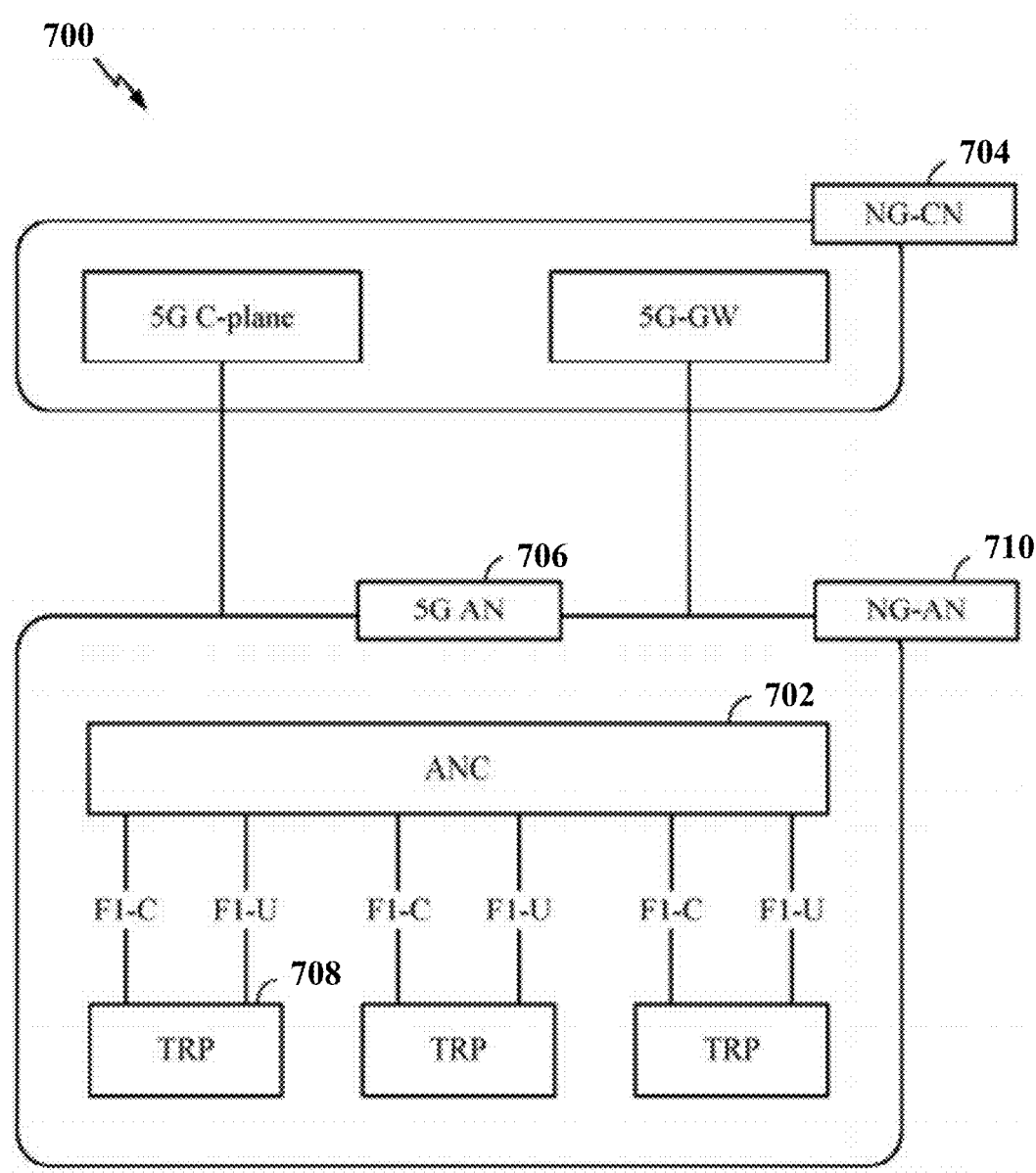
FIG. 7 illustrates an example logical architecture of a distributed access network.

FIG. 7 illustrates an example logical architecture of a distributed RAN, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 700 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture of the distributed RAN 700. The PDCP, RLC, MAC protocol may be adaptably placed at the ANC or TRP.

Figure 8:
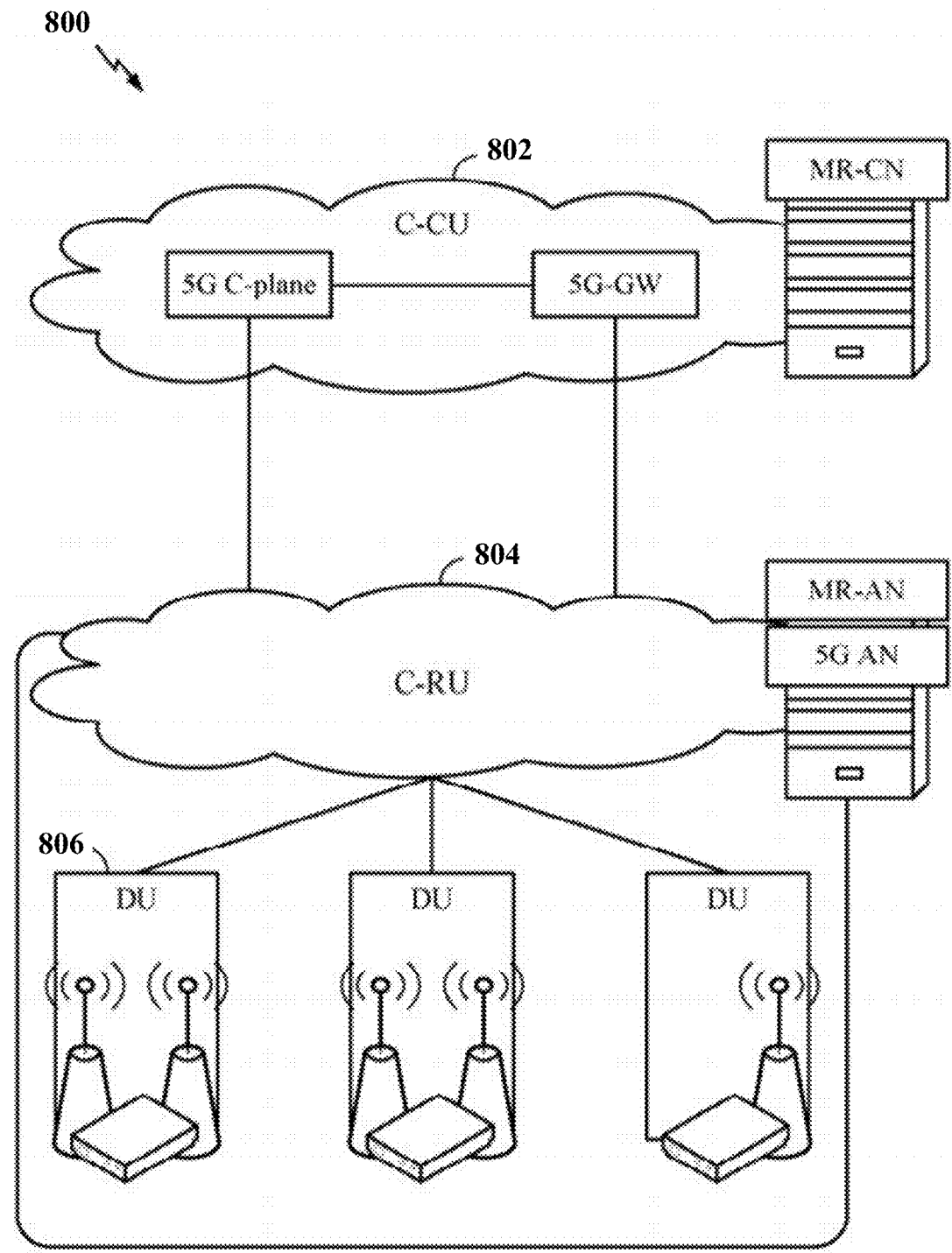
FIG. 8 illustrates an example physical architecture of a distributed access network.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity. A centralized RAN unit (C-RU) 804 may host one or more ANC functions. Optionally, the C-RU may host core network functions locally. The C-RU may have distributed deployment. The C-RU may be closer to the network edge. A distributed unit (DU) 806 may host one or more TRPs. The DU may be located at edges of the network with radio frequency (RF) functionality.

Figure 9:
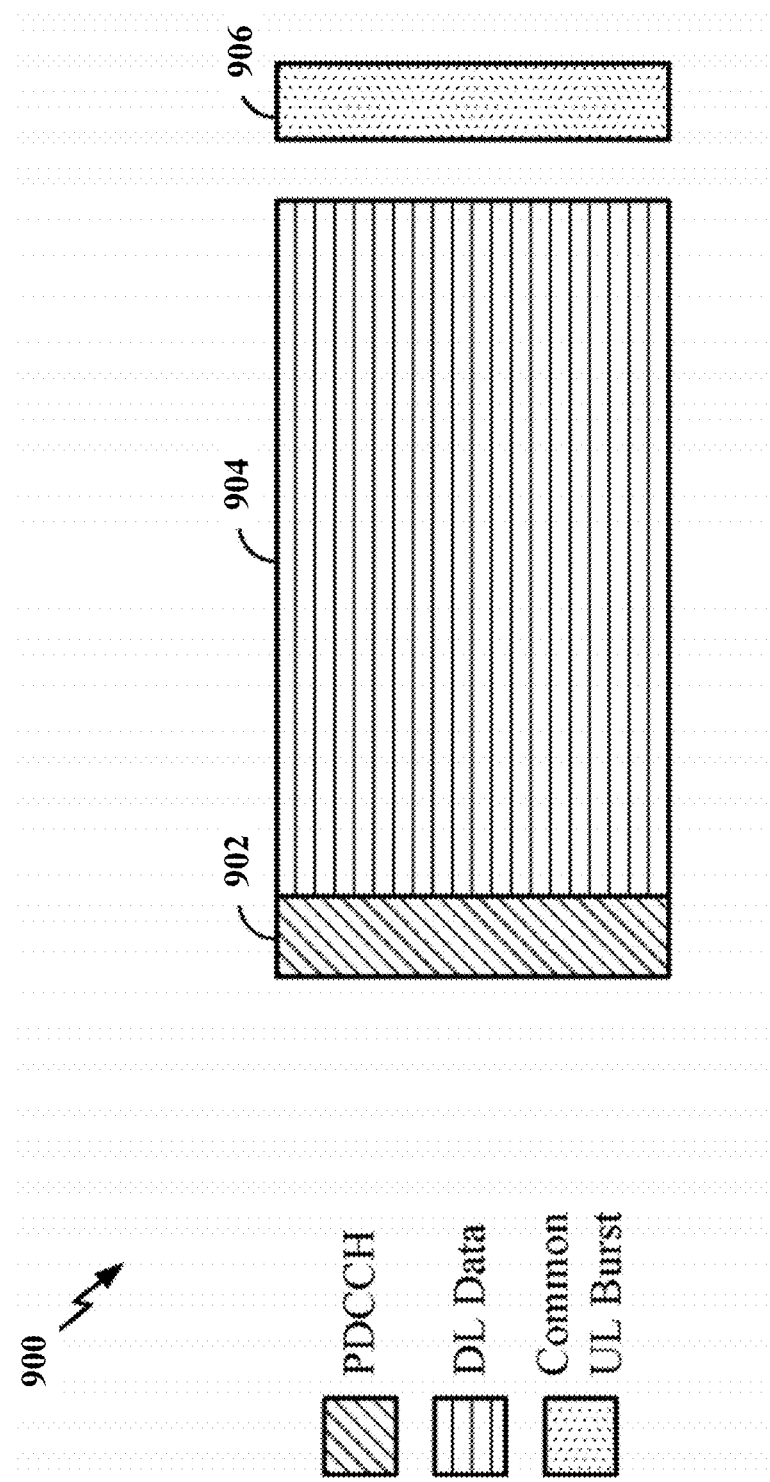
FIG. 9 is a diagram showing an example of a DL-centric subframe.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information.

As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
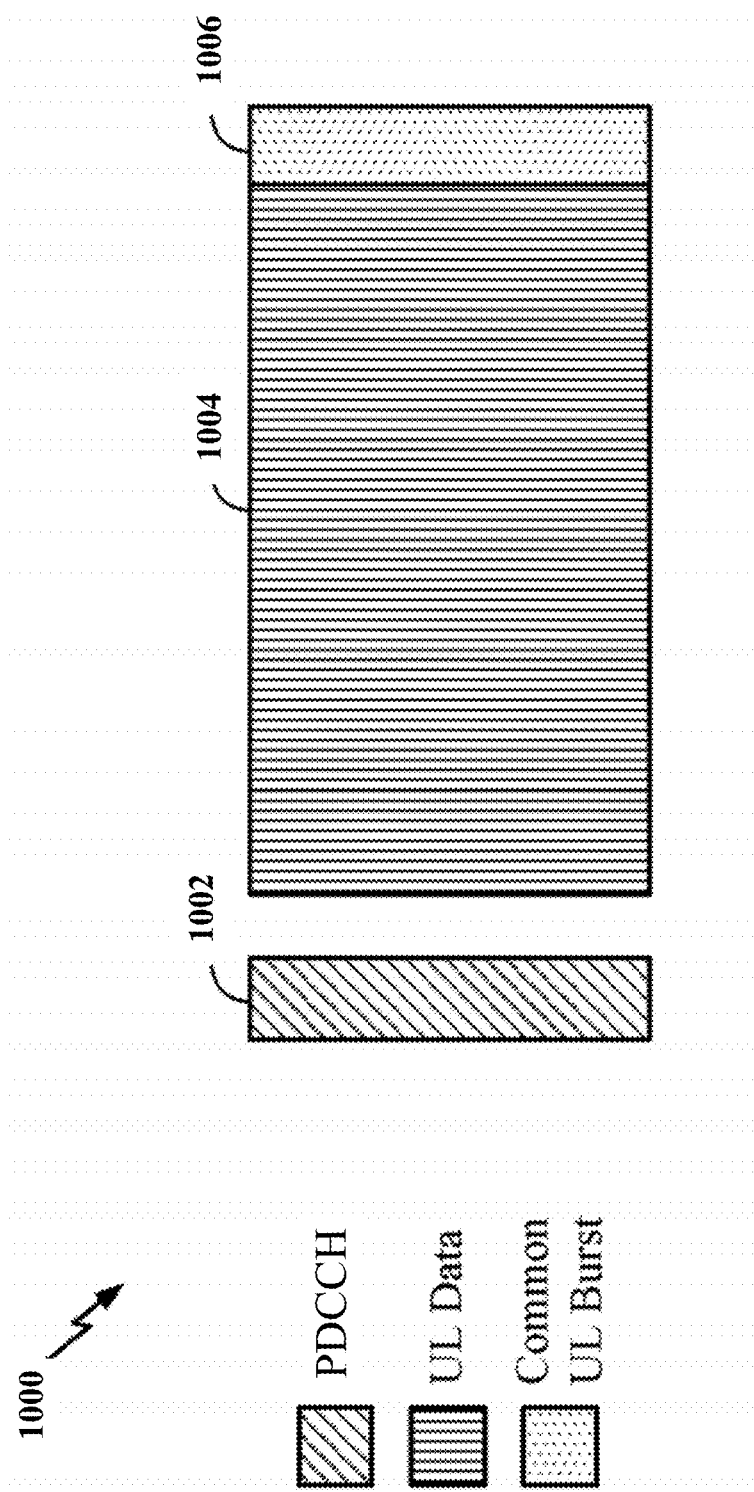
FIG. 10 is a diagram showing an example of an UL-centric subframe.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 902 described above with reference to FIG. 9. The UL-centric subframe may also include an UL data portion 1004. The UL data portion 1004 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 1002 may be a physical DL control channel (PDCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 11:
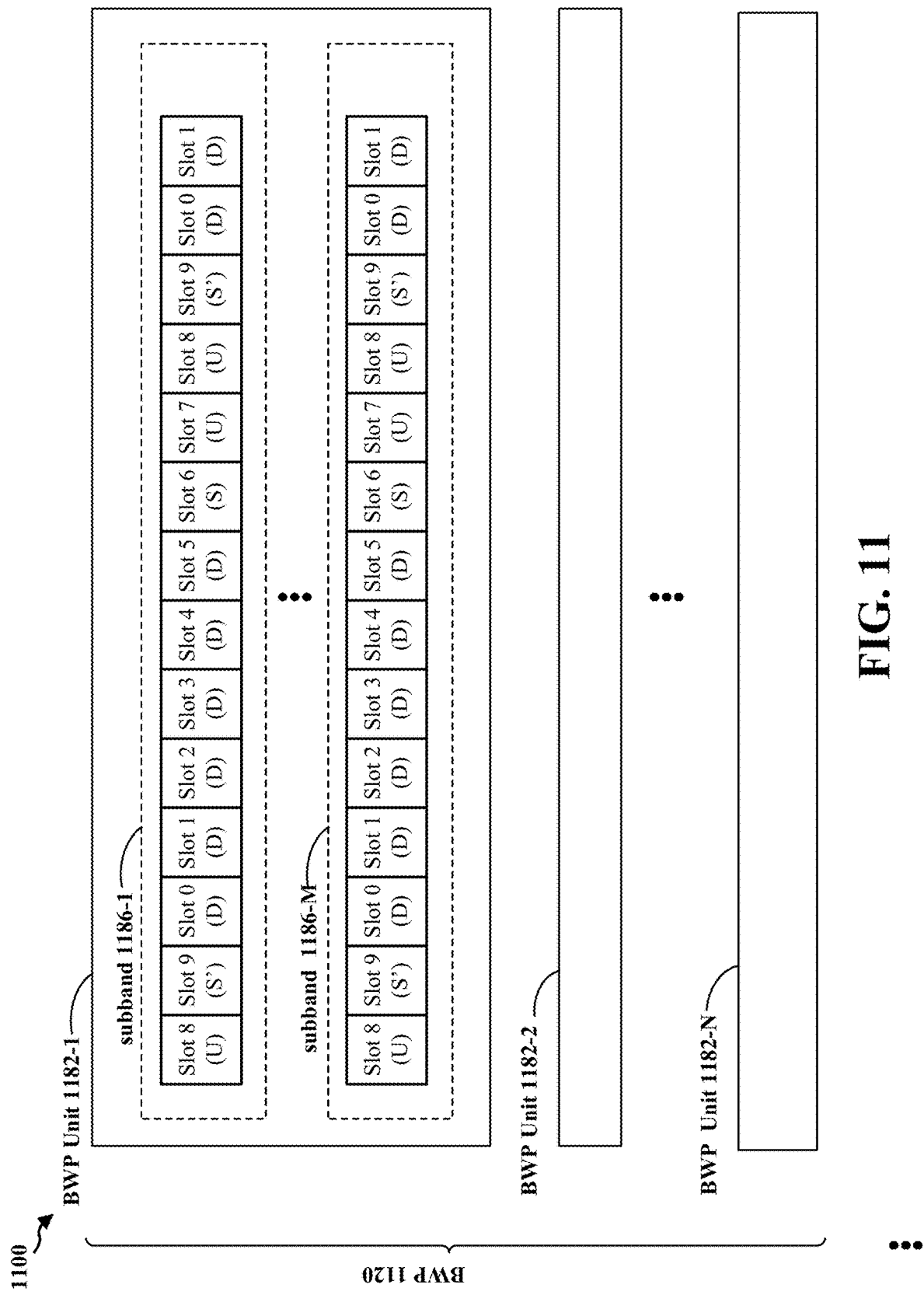
FIG. 11 is a diagram illustrating communication between a base station and a UE on an unlicensed carrier.

FIG. 11 is a diagram 1100 illustrating communication between a base station and a UE on an unlicensed carrier. The UE 104 and the base station 102 may communicate in one or more bandwidth parts, including a bandwidth part 1120, on an unlicensed carrier 1180. That is, the unlicensed carrier 1180 is in an unlicensed spectrum.

Further, the bandwidth part 1120 can be divided into a set of bandwidth part units 1182-1, 1182-2, . . . , 1182-N. The bandwidth part units 1182-1, 1182-2, . . . , 1182-N can be determined by configuration signaled by the base station 102. The bandwidth part units 1182-1, 1182-2, . . . , 1182-N can be determined by predefined rules or default values that are configured in the base station 102 and the UE 104. Example of predefined rules include (1) the default bandwidth of a BWP unit is the bandwidth of the corresponding BWP; (2) the default bandwidth of a BWP unit is the bandwidth of an LBT sub-band. If the UE 104 does not receive the configuration of BWP units signaled by the base station 102, the UE 104 can determine the BWP unit configuration based on predefined rules or default values.

Each bandwidth part unit has a portion of contiguous frequency resources in its bandwidth part and may have a configured bandwidth. For example, the bandwidth of a bandwidth part unit may be 20 MHz, 40 MHz, 80 MHz, etc. Each of the bandwidth part unit includes one or more subbands. For example, the bandwidth part unit 1182-1 contains subbands 1186-1, . . . , 1186-M. In particular, a subband may have a bandwidth (e.g., 20 MHz) configured for LBT operations.

In one example, the base station 102 may attempt use the bandwidth part unit 1182-1 in the bandwidth part 1120 on the unlicensed carrier 1180 to communicate with one or more UEs including the UE 104. Accordingly, the base station 102 may use a CCA procedure described supra to reserve each of the subbands 1186-1, . . . , 1186-M.

More specifically, in this example, the base station 102 define a LBT slot structure that includes slot 0 to slot 9. Each slot may be similar or analogous to a subframe or a portion of a subframe described supra referring to FIGS. 2-5. The base station 102 can perform a CCA procedure in a slot 9 on each of the subbands 1186-1, . . . , 1186-M.

When CCA procedures on all the subbands 1186-1, . . . , 1186-M are successful, the base station 102 decides that transmission in the bandwidth part unit 1182-1 is allowed. On the other hand, when not all the CCA procedures on the subbands 1186-1, . . . , 1186-M are successful (i.e., some CCA procedures failed), then the base station 102 determines that transmission on the BWP unit is not allowed. In this way, channel acquisition of a BWP may be contiguous or dis-contiguous depending on the LBT results of the BWP units in the BWP.

After determining that transmission in the bandwidth part unit 1182-1 is allowed, the base station 102 can transmit a D-CUBS 350 in the slot 9 or in the following slot 0 on some or all of the subbands 1186-1, . . . , 1186-M. The D-CUBS 350 may be a CRS, a CSI-RS, a DMRS, a preamble sequence, a synchronization signal, or a PDCCH.

Further, the base station 102 send configurations of a CORESET that is confined within a BWP unit. For example, the base station 102 may transmit a CORESET configuration in the bandwidth part unit 1182-1, where the CORESET configuration defines a CORESET whose resources are all within the bandwidth part unit 1182-1. Similarly, scheduling of PDSCH may be confined within a BWP unit. For example, the base station 102 may transmit in the bandwidth part unit 1182-1 a PDCCH scheduling a PDSCH whose resources are all within the bandwidth part unit 1182-1.

Accordingly, the UE 104 monitors those signals that may be transmitted by the base station 102 in each bandwidth part unit on the unlicensed carrier 1180. More specifically, the signals being monitored by the UE 104 can be a DMRS (e.g., (PDCCH DMRS, PDSCH DMRS), a CSI-RS, a preamble (e.g., a PRACH preamble, a Wi-Fi preamble), and synchronization signals (NR-PSS-based signal, NR-SSS-based signal). The UE 104 can also monitor channels such as PDCCH and PDSCH.

In certain configurations, the UE 104 can initially monitor a signal, then a PDCCH, and finally a PDSCH on a BWP unit. Specifically, if the UE 104 detects a signal, the UE 104 starts monitoring a PDCCH. If the UE 104 further detects a PDCCH, then UE decodes PDSCH if the detected PDCCH schedules a PDSCH.

In certain configurations, the UE 104 can monitor a PDCCH and a PDSCH regardless of whether or not a signal is detected. In certain configurations, the UE 104 can monitor a PDCCH and a PDSCH in a particular BWP unit of the bandwidth part units 1182-1, 1182-2, . . . , 1182-N. Alternatively, the UE 104 can monitor a signal, and then a PDCSCH in a BWP unit on the unlicensed carrier 1180, while PDCCH is transmitted one a licensed carrier between the UE 104 and the base station 102.

Further, in this example, the UE 104 receives PDSCH in the bandwidth part unit 1182-1. The UE 104 may send HARQ-ACK responding to the received PDSCH in the same bandwidth part unit (i.e., the bandwidth part unit 1182-1) on a primary BWP unit (e.g., the bandwidth part unit 1182-2) designated for communication between the base station 102 and the UE 104.

In certain configurations, the UE 104 may monitor a first set of BWP units (e.g., the bandwidth part unit 1182-1 and the bandwidth part unit 1182-2) in a first time duration and a second set of BWP units (e.g., the bandwidth part unit 1182-3 to the bandwidth part unit 1182-N) in a second time duration. In other words, the UE 104 can monitor more than one set of BWP units during the entire duration of a channel occupancy time (COT). Further, when UE 104 receives/detects an indication from the base station 102 indicating that the set of BWP units the UE monitors is changed from the first set to the second set. The UE 104 accordingly switches from monitoring one set of bandwidth part units and another set of bandwidth part units. The indication can be carried by a PDCCH or a PDSCH.

As described supra, for downlink, the base station 102 transmits in a BWP unit (e.g., the bandwidth part unit 1182-1) only when CCA procedures on all the sub-bands of the BWP unit were successful. For uplink, the UE 104 transmits uplink transmissions on a BWP unit (e.g., the bandwidth part unit 1182-1) only when the UE 104 detects signals or channels on all the subbands (e.g., the subbands 1186-1, ..., 1186-M) of the BWP unit (which indicates that the base station 102 has reserved all the subbands).

The CCA procedures performed on each of the bandwidth part units 1182-1, 1182-2, ..., 1182-N may be the same of different. For example, the category of LBT on each of the bandwidth part units 1182-1, 1182-2, ..., 1182-N may be different. When in category 1, the base station 102 may not perform any CCA procedure before transmitting in a particular bandwidth part unit. When in category 2, the base station 102 performs a CCA procedure without random back off in a particular bandwidth part unit. When in category 3, the base station 102 performs a CCA procedure with random back off with a fixed size contention window in a particular bandwidth part unit. When in category 4, the base station 102 performs a CCA procedure with random back off with a variable size contention window in a particular bandwidth part unit.

In certain configurations, when a designated (primary) BWP unit (e.g., the bandwidth part unit 1182-2) is configured and has passed its CCA procedure, the requirements in LBT (e.g., the CCA procedure) for other (secondary) BWP units (e.g., the bandwidth part unit 1182-1) can be relaxed. For example, the primary bandwidth part unit may require a category 4 LBT, while the secondary bandwidth part units may only require a category 3 LBT. Some pre-defined rules can be used to decide which of the BWP units in a BWP is the designated/primary BWP unit. For example, if a default bandwidth part unit is configured, it can be used as a designated BWP unit. Further, the base station 102 can indicate the primary bandwidth part unit to the UE 104 through higher layer signaling (e.g., RRC signaling) or through a PDCCH.

Figure 12:
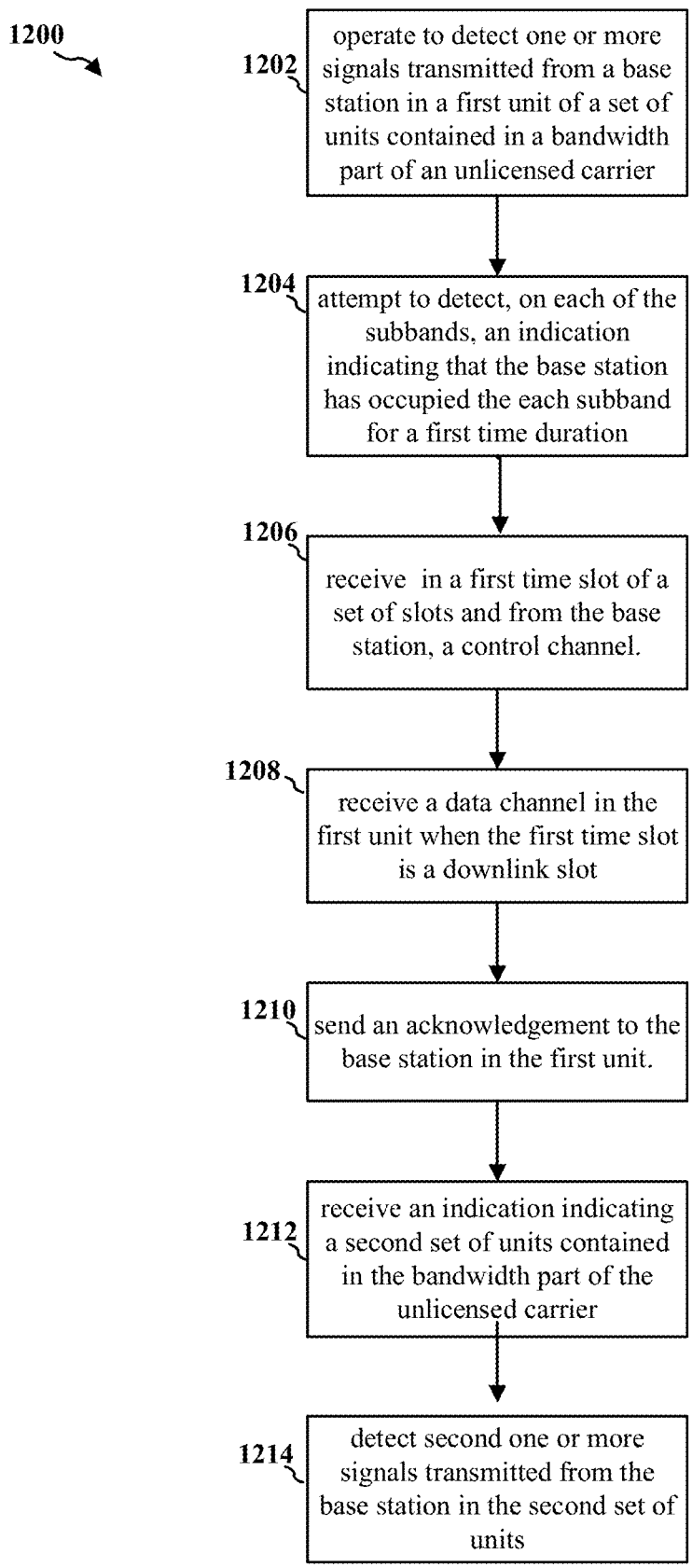
FIG. 12 is a flow chart of a method (process) for communicating on an unlicensed carrier.

FIG. 12 is a flow chart 1200 of a method (process) for communicating on an unlicensed carrier. The method may be performed by a UE (e.g., the UE 704, the apparatus 1302, and the apparatus 1302'). At operation 1202, the UE operates to detect one or more signals transmitted from a base station in a first unit of a set of units contained in a bandwidth part of an unlicensed carrier. In certain configurations, the one or more signals includes at least one of a demodulation reference signal (DMRS), a channel state information reference signal (CSI-RS), a preamble sequence, a synchronization signal, and a physical downlink control channel (PDCCH) transmitted in the first unit of the bandwidth part. The first unit has contiguous frequency resources. The one or more signals indicate that the base station has occupied the first unit for a first time duration and indicate a schedule of a set of slots in the first time duration for communication with the base station. In certain configurations, the UE receives a configuration from the base station, the configuration indicating resource allocation of the set of units. In certain configurations, the UE determines resource allocation of the set of units based on a predetermined rule.

In certain configurations, the first unit has a set of subbands. At operation 1204, the UE attempts to detect, on each of the subbands, an indication indicating that the base station has occupied the each subband for the first time duration. In certain configurations, the one or more signals detected by the UE include the indications on all the subbands of the first unit.

At operation 1206, the UE receives, in a first time slot of the set of slots and from the base station, a control channel. In certain configurations, the control channel indicates a data channel to be transmitted in the first unit, the method further comprising. In certain configurations, the control channel is received on a licensed carrier. In certain configurations, the UE receives a control resource set (CORESET) configuration from the base station, the CORESET configuration indicates a CORESET allocated to the UE that is confined within the first unit of the bandwidth part.

At operation 1208, the UE receives the data channel in the first unit when the first time slot is a downlink slot. In certain configurations, resources of the data channel indicated by the control channel are confined within the first unit of the bandwidth part. At operation 1210, the UE sends an acknowledgement to the base station in the first unit.

In certain configurations, the set of units further includes a second unit having contiguous frequency resources. In certain configurations, the frequency resources of the first unit and the frequency resources of the second unit are contiguous. In certain configurations, the frequency resources of the first unit and the frequency resources of the second unit are not contiguous. In certain configurations, the UE receives a data channel in the second unit of the bandwidth part. The UE sends an acknowledgement to the base station in the first unit, the first unit being a primary unit in the bandwidth part.

At operation 1212, the UE receives an indication indicating a second set of units contained in the bandwidth part of the unlicensed carrier. At operation 1214, the UE detects second one or more signals transmitted from the base station in a second set of units, the second one or more signals indicating that the base station has occupied one or more units of the second set of units for a second time duration. In certain configurations, the second one or more signals is being detected in response to receiving the indication indicating the second set of units.

Figure 13:
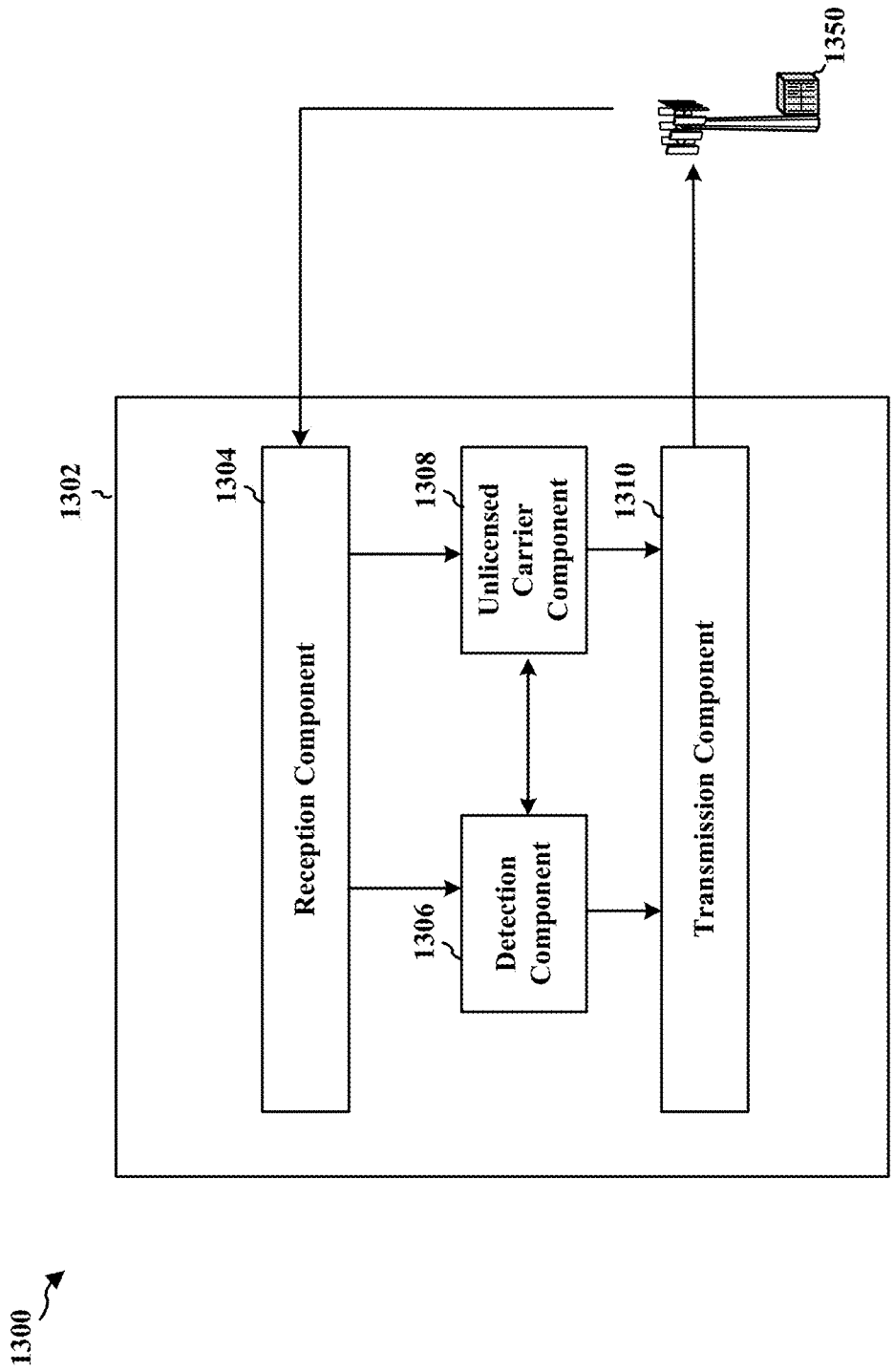
FIG. 13 is a conceptual data flow diagram illustrating the data flow between different components/means in an exemplary apparatus.

FIG. 13 is a conceptual data flow diagram 1300 illustrating the data flow between different components/means in an exemplary apparatus 1302. The apparatus 1302 may be a UE. The apparatus 1302 includes a reception component 1304, a detection component 1306, an unlicensed carrier component 1308, and a transmission component 1310.

The detection component 1306 operates to detect one or more signals transmitted from a base station in a first unit of a set of units contained in a bandwidth part of an unlicensed carrier. In certain configurations, the one or more signals includes at least one of a demodulation reference signal (DMRS), a channel state information reference signal (CSI-RS), a preamble sequence, a synchronization signal, and a physical downlink control channel (PDCCH) transmitted in the first unit of the bandwidth part. The first unit has contiguous frequency resources. The one or more signals indicate that the base station has occupied the first unit for a first time duration and indicate a schedule of a set of slots in the first time duration for communication with the base station. In certain configurations, the apparatus 1302 receives a configuration from the base station, the configuration indicating resource allocation of the set of units. In certain configurations, the apparatus 1302 determines resource allocation of the set of units based on a predetermined rule.

In certain configurations, the first unit has a set of subbands. The detection component 1306 attempts to detect, on each of the subbands, an indication indicating that the base station has occupied the each subband for the first time duration. In certain configurations, the one or more signals detected by the apparatus 1302 include the indications on all the subbands of the first unit.

The unlicensed carrier component 1308 receives, in a first time slot of the set of slots and from the base station, a control channel. In certain configurations, the control channel indicates a data channel to be transmitted in the first unit, the method further comprising. In certain configurations, the control channel is received on a licensed carrier. In certain configurations, the apparatus 1302 receives a CORESET configuration from the base station, the CORESET configuration indicates a CORESET allocated to the apparatus 1302 that is confined within the first unit of the bandwidth part.

The unlicensed carrier component 1308 receives the data channel in the first unit when the first time slot is a downlink slot. In certain configurations, resources of the data channel indicated by the control channel are confined within the first unit of the bandwidth part. The unlicensed carrier component 1308 sends an acknowledgement to the base station in the first unit.

In certain configurations, the set of units further includes a second unit having contiguous frequency resources. In certain configurations, the frequency resources of the first unit and the frequency resources of the second unit are contiguous. In certain configurations, the frequency resources of the first unit and the frequency resources of the second unit are not contiguous. In certain configurations, the apparatus 1302 receives a data channel in the second unit of the bandwidth part. The apparatus 1302 sends an acknowledgement to the base station in the first unit, the first unit being a primary unit in the bandwidth part.

The unlicensed carrier component 1308 receives an indication indicating a second set of units contained in the bandwidth part of the unlicensed carrier. The detection component 1306 detects second one or more signals transmitted from the base station in a second set of units, the second one or more signals indicating that the base station has occupied one or more units of the second set of units for a second time duration. In certain configurations, the second one or more signals is being detected in response to receiving the indication indicating the second set of units.

Figure 14:
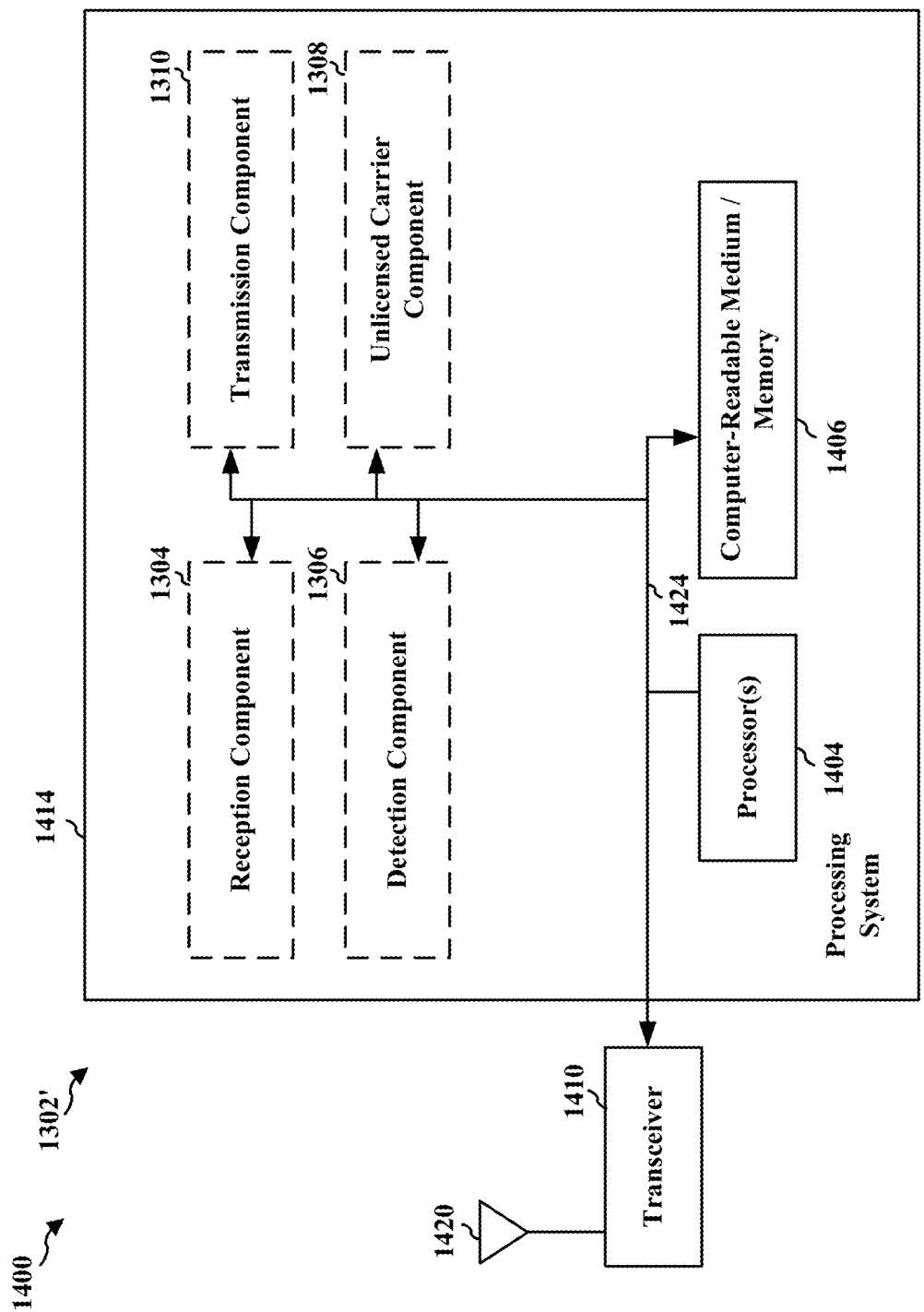
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The apparatus 1302' may be a UE. The processing system 1414 may be implemented with a bus architecture, represented generally by a bus 1424. The bus 1424 may include any number of interconnecting buses and bridges depending on the specific application of the processing system 1414 and the overall design constraints. The bus 1424 links together various circuits including one or more processors and/or hardware components, represented by one or more processors 1404, the reception component 1304, the detection component 1306, the unlicensed carrier component 1308, the transmission component 1310, and a computer-readable medium/memory 1406. The bus 1424 may also link various other circuits such as timing sources, peripherals, voltage regulators, and power management circuits, etc.

The processing system 1414 may be coupled to a transceiver 1410, which may be one or more of the transceivers 654. The transceiver 1410 is coupled to one or more antennas 1420, which may be the communication antennas 652.

The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420.

The processing system 1414 includes one or more processors 1404 coupled to a computer-readable medium/memory 1406. The one or more processors 1404 are responsible for general processing, including the execution of software stored on the computer-readable medium/memory 1406. The software, when executed by the one or more processors 1404, causes the processing system 1414 to perform the various functions described supra for any particular apparatus. The computer-readable medium/memory 1406 may also be used for storing data that is manipulated by the one or more processors 1404 when executing software. The processing system 1414 further includes at least one of the reception component 1304, the detection component 1306, the unlicensed carrier component 1308, and the transmission component 1310. The components may be software components running in the one or more processors 1404, resident/stored in the computer readable medium/memory 1406, one or more hardware components coupled to the one or more processors 1404, or some combination thereof. The processing system 1414 may be a component of the UE 650 and may include the memory 660 and/or at least one of the TX processor 668, the RX processor 656, and the communication processor 659.

In one configuration, the apparatus 1302/apparatus 1302' for wireless communication includes means for performing each of the operations of FIG. 12. The aforementioned means may be one or more of the aforementioned components of the apparatus 1302 and/or the processing system 1414 of the apparatus 1302' configured to perform the functions recited by the aforementioned means.

As described supra, the processing system 1414 may include the TX Processor 668, the RX Processor 656, and the communication processor 659. As such, in one configuration, the aforementioned means may be the TX Processor 668, the RX Processor 656, and the communication processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   detecting, at the UE, one signal transmitted from a base station in a first unit of a set of units contained in a bandwidth part of an unlicensed carrier, the first unit having contiguous frequency resources, wherein the first unit in the bandwidth part contains two or more subbands each occupying a range of frequency that is equal to a frequency band configured for a Listen-Before-Talk (LBT) operation performed by the base station, wherein the one signal is detected on not all of the two or more subbands of the unlicensed carrier; and
   determining, at the UE and based on the one signal detected on not all of the two or more subbands of the unlicensed carrier, that the base station has passed an LBT operation and occupies each of the two or more subbands for a first continuous time duration that is an allocated channel occupancy time including (a) a number of downlink slots or downlink symbols and (b) a number of uplink slots or uplink symbols.

2. The method of claim 1, wherein the one signal further indicates a schedule of a set of slots in the first time duration for communication with the base station, the method further comprising:
   receiving, in a first time slot of the set of slots and from the base station, a control channel indicating a data channel to be transmitted in the first unit; and
   receiving the data channel in the first unit when the first time slot is a downlink slot.

3. The method of claim 2, wherein resources of the data channel indicated by the control channel are confined within the first unit of the bandwidth part.

4. The method of claim 2, further comprising:
   subsequent to the receiving the data channel in the first unit of the bandwidth part, sending an acknowledgement to the base station in the first unit.

5. The method of claim 2, wherein the control channel is received on a licensed carrier.

6. The method of claim 1, further comprising
   receiving a configuration from the base station, the configuration indicating resource allocation of the set of units.

7. The method of claim 1, further comprising
   determining resource allocation of the set of units based on a predetermined rule.

8. The method of claim 1, further comprising:
   wherein the one signal is one of a demodulation reference signal (DMRS), a channel state information reference signal (CSI-RS), a preamble sequence, a synchronization signal, and a physical downlink control channel (PDCCH) transmitted in the first unit of the bandwidth part.

9. The method of claim 1, further comprising:
   receiving a control resource set (CORESET) configuration from the base station, the CORESET configuration indicates a CORESET allocated to the UE that is confined within the first unit of the bandwidth part.

10. The method of claim 1, wherein the set of units further includes a second unit having contiguous frequency resources.

11. The method of claim 10, wherein the frequency resources of the first unit and the frequency resources of the second unit are contiguous.

12. The method of claim 10, wherein the frequency resources of the first unit and the frequency resources of the second unit are not contiguous.

13. The method of claim 10, further comprising:
   receiving a data channel in the second unit of the bandwidth part; and
   sending an acknowledgement to the base station in the first unit, the first unit being a primary unit in the bandwidth part.

14. The method of claim 1, further comprising:
   detecting second one or more signals transmitted from the base station in a second set of units contained in the bandwidth part of the unlicensed carrier, the second one or more signals indicating that the base station has occupied one or more units of the second set of units for a second time duration.

15. The method of claim 14, further comprising:
   receiving an indication indicating the second set of units, wherein the second one or more signals is being detected in response to receiving the indication indicating the second set of units.

16. An apparatus for wireless communication, the apparatus being a user equipment (UE), comprising:
   a memory; and
   at least one processor coupled to the memory and configured to:
      detect, at the UE, one signal transmitted from a base station in a first unit of a set of units contained in a bandwidth part of an unlicensed carrier, the first unit having contiguous frequency resources, wherein the first unit in the bandwidth part contains two or more subbands each occupying a range of frequency that is equal to a frequency band configured for a Listen-Before-Talk (LBT) operation performed by the base station, wherein the one signal is detected on not all of the two or more subbands of the unlicensed carrier; and determine, at the UE and based on the one signal detected on not all of the two or more subbands of the unlicensed carrier, that the base station has passed an LBT operation and occupies each of the two or more subbands for a first continuous time duration that is an allocated channel occupancy time including (a) a number of downlink slots or downlink symbols and (b) a number of uplink slots or uplink symbols.

17. The apparatus of claim 16, wherein the one signal further indicates a schedule of a set of slots in the first time duration for communication with the base station, wherein the at least one processor is further configured to:

receive, in a first time slot of the set of slots and from the base station, a control channel indicating a data channel to be transmitted in the first unit; and receive the data channel in the first unit when the first time slot is a downlink slot.

18. A non-transitory computer-readable medium storing computer executable code for wireless communication of a user equipment (UE), comprising code to:

detect, at the UE, one signal transmitted from a base station in a first unit of a set of units contained in a bandwidth part of an unlicensed carrier, the first unit having contiguous frequency resources, wherein the first unit in the bandwidth part contains two or more subbands each occupying a range of frequency that is equal to a frequency band configured for a Listen-Before-Talk (LBT) operation performed by the base station, wherein the one signal is detected on not all of the two or more subbands of the unlicensed carrier; and determine, at the UE and based on the one signal detected on not all of the two or more subbands of the unlicensed carrier, that the base station has passed an LBT operation and occupies each of the two or more subbands for a first continuous time duration that is an allocated channel occupancy time including (a) a number of downlink slots or downlink symbols and (b) a number of uplink slots or uplink symbols.

\* \* \* \* \*